US 8,449,850 B2

(12) United States Patent
Glenn et al.

(10) Patent No.: US 8,449,850 B2
(45) Date of Patent: May 28, 2013

(54) METHOD AND APPARATUS FOR THE EXTRACTION AND PROCESSING OF MOLYBDENUM-99

(75) Inventors: Daniel E. Glenn, Forest, VA (US); Scott B. Aase, Forest, VA (US); William R. Stagg, Lynchburg, VA (US)

(73) Assignee: Babcock & Wilcox Technical Services Group, Inc., Lynchburg, VA (US)

( * ) Notice: Subject to any disclaimer, the term of this patent is extended or adjusted under 35 U.S.C. 154(b) by 0 days.

(21) Appl. No.: 13/029,332

(22) Filed: Feb. 17, 2011

(65) Prior Publication Data
US 2011/0206579 A1 Aug. 25, 2011

Related U.S. Application Data

(60) Provisional application No. 61/306,363, filed on Feb. 19, 2010.

(51) Int. Cl.
*C01G 3/00* (2006.01)
(52) U.S. Cl.
USPC .................................. 423/6; 423/54
(58) Field of Classification Search
USPC ....................... 423/6, 54; 502/400, 415
See application file for complete search history.

(56) References Cited

U.S. PATENT DOCUMENTS

| 3,382,152 A | * | 5/1968 | Lieberman et al. | 376/186 |
| 3,468,808 A | * | 9/1969 | Arino | 424/1.61 |
| 3,745,119 A | * | 7/1973 | Arino et al. | 424/1.65 |
| 3,799,883 A | | 3/1974 | Arino | |
| 3,891,741 A | | 6/1975 | Carlin | |
| 4,089,429 A | | 5/1978 | Stock | |
| 4,094,953 A | | 6/1978 | Hadi | |
| 4,123,498 A | | 10/1978 | Rosenbaum | |
| 4,981,658 A | | 1/1991 | Ali | |
| 5,508,010 A | | 4/1996 | Sameh | |
| 5,596,611 A | | 1/1997 | Ball | |
| 5,910,971 A | | 6/1999 | Ponomarev-Stepnoy | |
| 2009/0225923 A1 | | 9/2009 | Neeley | |

FOREIGN PATENT DOCUMENTS

| GB | 1473683 A | 5/1977 |
| WO | 2009035994 A | 3/2009 |

OTHER PUBLICATIONS

PCT International Search Report dated Apr. 22, 2011 for Appl. No. PCT/US2011/025305.
PCT International Search Report Written Opinion dated Apr. 22, 2011 for Application No. PCT/US2011/025305.

* cited by examiner

*Primary Examiner* — Steven Bos
(74) *Attorney, Agent, or Firm* — Eric Marich (57) ABSTRACT

A method for the extraction and purification of molybdenum, the method comprising the steps of: transferring an irradiated fuel solution to an extraction system, the irradiated fuel solution comprising iodine and molybdenum and other fission products, the extraction system comprising at least one sorbent column; passing the irradiated fuel solution upwards through the at least one sorbent-containing extraction column; directing the irradiated fuel solution towards a fuel management system by means of at least one discharge alignment valve; directing the extraction column eluate towards an iodine removal system; removing the iodine from the extraction column eluate; purifying the extraction column eluate; and collecting the purified eluate. Also disclosed is an apparatus for accomplishing the aforementioned method.

40 Claims, 5 Drawing Sheets

METHOD AND APPARATUS FOR THE EXTRACTION AND PROCESSING OF MOLYBDENUM-99

This application claims the benefit of U.S. Provisional Application No. 61/306,363 filed Feb. 19, 2010. U.S. Provisional Application No. 61/306,363 filed Feb. 19, 2010 is hereby incorporated by reference in its entirety.

FIELD AND BACKGROUND OF THE INVENTION

The present invention relates generally to the field of medical isotopes production systems and extraction and purification processes therefore.

The primary target-irradiated, fission-produced molybdenum extractions and purification processes in use today are generally described in the 1998 IAEA report and a 2009 report published by the National Academies. In addition a detailed description of the Cintichem process may be found in the NEPA documentation associated with an earlier effort by the Department of Energy to make molybdenum-99 (Mo-99). These methodologies are summarized as follows.

At the National Institute for Radioelements IRE (Belgium) the following process is utilized: The targets are dissolved in sodium hydroxide (NaOH). Uranium (U) and fission products (FPs) precipitate out as hydroxides using a strong aqueous base (e.g., an approximately 10M solution NaOH). However, iodine (I) and Mo do not. The acidified solution causes iodine to be released and captured on a platinum-asbestos trap. The solution is then passed through an alumina column to capture Mo. Mo is then eluted via ammonium hydroxide ($NH_4OH$). The Mo is then purified via ion-exchange resin (DOWEX®). The solution is then acidified with sulfuric acid ($H_2SO_4$) and passed through activated carbon.

At Mallinckrodt Baker (Netherlands), the following process is utilized: The targets are dissolved in NaOH. Mo and many other FPs are absorbed on an AG 1-X8 column. Next, Mo and other FPs are eluted off the AG 1-X8 columns with sulfuric acid. Then the acidified solution enters ion-exchange column (SM-7) to retain iodine. The acidified solution then enters a magnesium dioxide ($MnO_2$) column and is purified from FPs via a chromatography method (the molybdenum remains on the column). The $MnO_2$ column is then dissolved in $H_2SO_4$. The molybdenum is then captured on a CHELEX® resin column. Next, the molybdenum is eluted with $NH_4OH$. The molybdenum then undergoes final purification via sublimation.

At NTP Radioisotopes (South Africa), the following process is utilized: The targets are dissolved in NaOH. Uranium and most FPs precipitate out as hydroxides, Mo does not. The solution then goes through two unspecified anion exchange columns—both eluted via unspecified solution. Next, the solution goes through a final chelating resin and is eluted with $NH_4OH$. The $NH_4OH$ eluate is filtered and evaporated. A residue containing Mo is re-dissolved with NaOH to convert the Mo to molybdate.

At the Karpov Institute of Physical Chemistry (Russia), the following procedure is utilized: The targets are dissolved in nitric acid ($HNO_3$) and FP gases are captured and held. Molybdenum and a few other FPs are separated into an organic phase; most of the U and FPs remain in the aqueous phase. Next a "re-extraction" step is performed (the molybdenum is in the aqueous phase, the remaining U and FPs are in the organic phase). Then the aqueous molybdenum-containing solution is passed through a non-specified chromatographic column. The aqueous solution is then evaporated. The molybdenum-containing residue is then dissolved in either an acid or an alkali solution.

In the ANSTO LEU process (Australia), the targets are first dissolved in $HNO_3$. The solution is passed through an alumina sorbent column. The alumina column is then washed with nitric acid, water and a dilute ammonia solution. The molybdenum is eluted from the column with concentrated ammonia solution. The solution is then boiled to remove iodine and ruthenium. The Karlsruhe LEU process (Germany) is generally similar to the Mallinckrodt process. The process followed by CNEA (Argentina) is thought to be similar to the Mallinckrodt process.

The Cintichem process (United States) may be broken down into an extraction phase and a purification phase. In the extraction phase, first, the target is dissolved in nitric acid & sulfuric acid. Small amounts of sodium iodide (NaI), silver nitrate ($AgNO_3$), and hydrochloric acid (HCl) are added to precipitate iodine. Molybdenum is added to the carrier solution. Next an oxidizing agent ($KMnO_4$) is added. Carriers for rhodium and ruthenium are added. Molybdenum is precipitated with benzoin-α-oxime and filtered from the solution. Multiple acid rinse and filtration steps are then performed to capture a maximum amount of the molybdenum.

In the purification phase, there is a repeated washing of the filter cake with $H_2SO_4$ which still contains the iodine previously precipitated. It is then dissolved in NaOH and hydrogen peroxide $H_2O_2$ (an oxidizing agent). The solution is then purified via silver (Ag) on charcoal column (this removes the iodine). A second iodine precipitation is conducted. The solution is then filtered through a column containing silver on charcoal, hydrated zirconium oxide, and activated charcoal. The final solution is then filtered through a micron filter. It is believed that MDS Nordion (Canada) follows the Cintichem process.

U.S. Pat. No. 5,596,611 to Ball discloses a uranyl nitrate homogeneous reactor (100 kW to 300 kW) for the production of molybdenum-99. The reactor is immersed in a containment pool which serves as a heat removal media for the sensible and decay heat generated in the reactor. The reactor vessel is finned to enhance the heat transfer to the containment pool. The reactor operates in a continuous mode in which the radioactive waste products are re-circulated back into the reactor. A portion of the uranyl nitrate solution from the reactor is directly siphoned off and passed through columns of alumina to fix some of the fission products, including Mo-99, on the alumina. The Mo-99 and some fission products on the alumina column are then removed through elution with a hydroxide and the Mo-99 is either precipitated out of the resultant eluate with benzoin-α-oxime or passed through other columns.

In addition, U.S. Pat. No. 5,508,010 and United States Patent Application Publication No. 2010/0202943 A1 generally describe processes in which the isotope Mo-99 is separated from an aqueous solution containing a mixture of nuclear fission products.

The above processes suffer from various drawbacks due to processing inefficiencies, inefficiencies in the utilization of time and/or materials, and/or require the unnecessary consumption of operator time and attention. As such, there is a need in the art for an efficient molybdenum-99 extraction and purification method and apparatus.

SUMMARY OF THE INVENTION

As noted, several molybdenum purification processes are in use today. However, none of these processes can be performed as efficiently and/or in less time or can accommodate the initial conditions or volumes of an Aqueous Homogenous Reactor (AHR) fuel solution.

One aspect of the present invention is drawn to a method and apparatus for the extraction and purification of medical isotopes.

More particularly, the present invention is drawn to a method and apparatus for the extraction and purification of molybdenum from a large volume of highly radioactive uranyl nitrate fuel solution.

More particularly, the present invention is drawn to a method and apparatus for the extraction and purification of Mo-99 from a large volume of highly radioactive uranyl nitrate fuel solution.

The process, according to embodiments of the present invention, is designed to utilize a low enriched uranium-based (LEU-based) fuel that is dissolved in nitric acid, and then reuse the irradiated fuel solution; thereby drastically reducing the amount of radioactive waste generated in both the extraction and purification processes.

In one embodiment, the process of the present invention includes a combination extraction process and purification process. The extraction process includes the use of extraction columns containing a metal oxide sorbent. In one embodiment, the metal oxide sorbent is a titanium-containing oxide sorbent, a zirconium-containing oxide sorbent, a tin-containing oxide sorbent, an aluminum-containing oxide sorbent, or a mixture of any two or more of these oxide sorbents. In another embodiment, the metal oxide sorbent is a titanium dioxide-containing sorbent, a zirconium dioxide-containing sorbent, a tin dioxide sorbent, an aluminum (III) oxide-containing sorbent, or a mixture of any two or more of these oxide sorbents. The metal oxide sorbent of the present invention is selected and/or designed to capture fission produced Mo-99 and then subsequently release same from the column, leading up to the purification process. The purification process includes an iodine removal step which seeks to remove, at a minimum, one or more iodine compounds, or species. This iodine removal step could, in some embodiments, also facilitate and/or accomplish the removal of one or more fission products (FP) and/or one or more other impurities. The iodine removal step can be followed by one or more additional purification steps. In still another embodiment, the iodine removal step further includes the removal of one or more other fission products in combination with the removal of the iodine.

Embodiments of the present invention utilize a reactor irradiation and molybdenum extraction processes different from prior target irradiation processes. The captured molybdenum must then undergo a series of purification steps to assure that the strict purity requirements for medical uses are met.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE INVENTION

Figure 1:
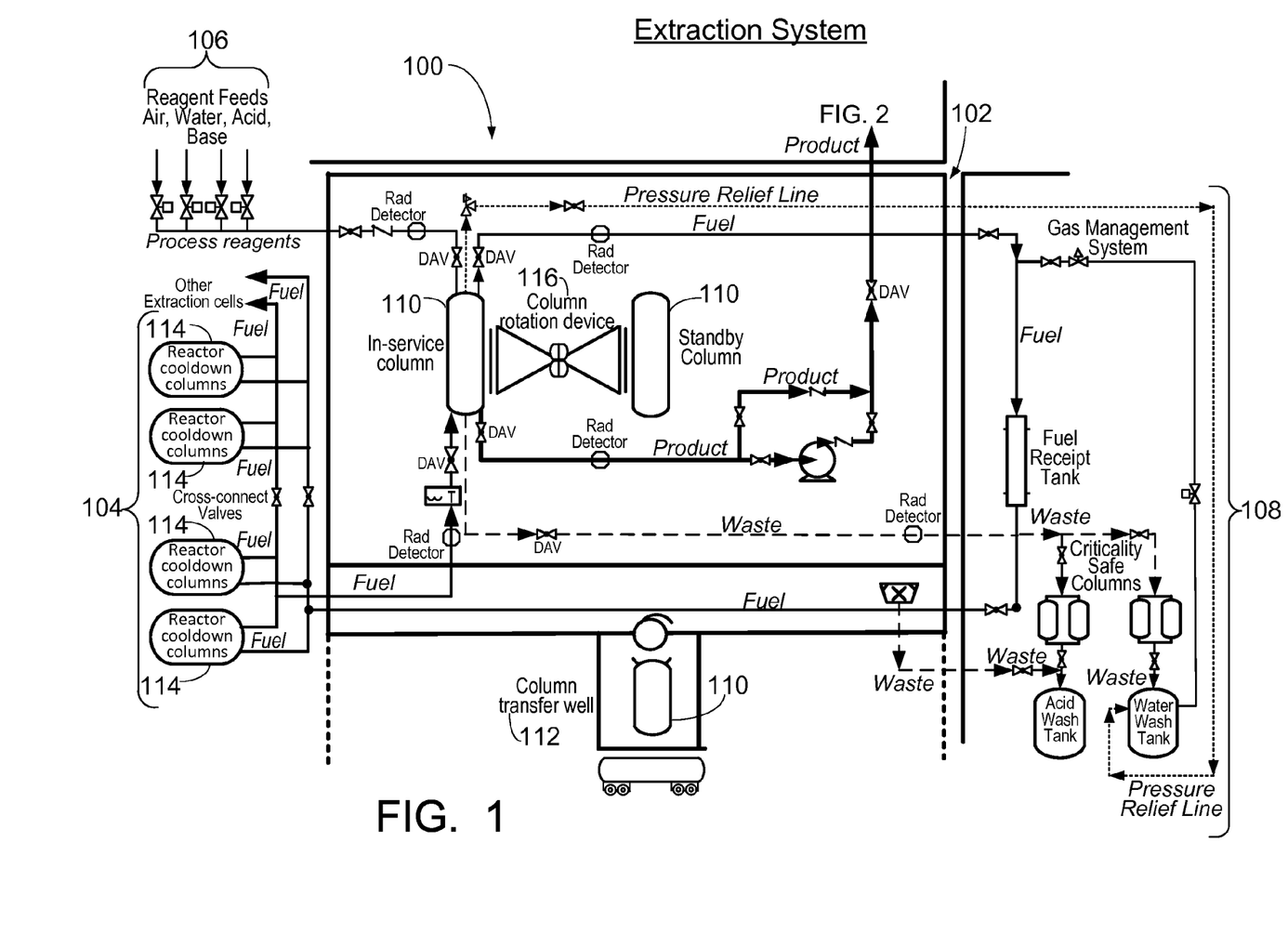
FIG. 1 is an illustration of an extraction system having at least one extraction cell according to one embodiment of the present invention.

Referring now to the drawings, wherein like references designate the same or functionally similar elements throughout the several drawings, FIG. 1 shows a layout of an extraction system 100 for performing the extraction process according to the present invention. The extraction system 100 comprises an extraction cell section 102; a reactor cool-down section 104; a reagent supply section 106; and a gas management, fuel management and/or waste management section (or sub-system) 108. Since each of the above sections could be dealing with a radiologically hot material, all of sections 102, 104 and 108 are shielded to prevent and/or control the escape of radiation. As can be seen from FIG. 1, extraction cell section 102 contains one or more extraction columns 110 and various other related components designed to achieve the production of Mo-99. Additionally, the associated column transfer well 112 is also shielded.

In the extraction process of the present invention, one or more specifically-designed extraction columns 110 are utilized where each extraction column 110 contains a metal oxide sorbent including, but not limited to, a titanium oxide sorbent, a zirconium oxide sorbent, an aluminum oxide sorbent, or a tin oxide sorbent, or a mixture of any two or more thereof. In another embodiment, the sorbent utilized in conjunction with the present invention is selected from titanium dioxide ($TiO_2$), zirconium dioxide ($ZrO_2$), tin dioxide ($SnO_2$), aluminum (III) oxide ($Al_2O_3$), or a mixture of any two or more thereof. In still another embodiment, the sorbent can be any chemical compound is capable of withstanding a high radiation field while simultaneously being able to capture fission-produced Mo-99 from an irradiated fuel solution and then subsequently releasing the Mo-99 from sorbent via an elution step. The Mo-99 so collected can then be subjected to further purification.

In one embodiment, the amount of metal oxide sorbent in each extraction column 110 is at least about 70 weight percent of the material that is utilized to "pack" each column with sorbent. In another embodiment, the amount of metal oxide sorbent (e.g., titanium oxide sorbent, titanium dioxide sorbent, zirconium oxide sorbent, zirconium dioxide sorbent, tin oxide sorbent, tin dioxide sorbent, aluminum oxide sorbent, or aluminum (III) oxide sorbent) in each extraction column 110 is at least about 75 weight percent of the total amount of material that is utilized to "pack" each column with sorbent, or at least about 80 weight percent, or at least about 85 weight percent, or at least about 90 weight percent, or at least about 95 weight percent, or at least about 97.5 weight percent, or even at least about 99 weight percent. Here, as well as elsewhere in the specification and claims, individual numerical values can be combined to form non-disclosed numerical ranges. Regarding the remainder of the material utilized to "pack" the one or more extraction columns 110 with sorbent, such material can be any material so long as such material is able to withstand the radiological environment that the sorbent is subjected to during the Mo-99 capture process. Such remainder material that could form the remainder of the "pack" includes, but is not limited to, support materials, inert materials, and any other material upon which the sorbent is contained, deposited, and/or supported on. In one embodiment, the one or more extraction columns 110 are packed with sorbent in such a manner to minimize void space while still permitting material to flow through the one or more extraction columns 110 thereby permitting maximum Mo-99 capture.

In one embodiment, the particle size of the metal oxide sorbent is selected to balance the competing demands to minimize system backpressure and provide maximum particle surface area to promote adsorption performance. Accordingly, in one embodiment, the sorbent has a spherical particle geometry and a particle size in the range of about 60 microns to about 120 microns, or from about 70 microns to about 110 microns, or from about 75 microns to about 105 microns, or even about 80 microns. In one embodiment, a suitable sorbent is spherically-shaped titanium dioxide and can be obtained from Sachtleben Chemie of Germany and is sold under the name SACHTOPORE® 80. In another embodiment, any type of particle geometry can be utilized so long as the sorbent permits the one or more extraction columns 110 to operate at a suitable processing rate. In another embodiment, to facilitate operations portions of the process of the present invention may be automated using solenoid control valves that are located outside of the hot cell.

The following is an exemplary process utilizing the extraction cell system 100 of the present invention. Regarding the following process, it should be noted that when stated, amounts are purely exemplary in nature and the present invention is not limited thereto. Rather, the present invention should be broadly construed in light of the system and method disclosed herein. A given amount of an irradiated fuel solution, in one instance between about 180 liters to about 260 liters, is transferred from fuel cool-down columns 114 to one or more extraction cells 102 via nitrogen pressure and vacuum transfer. The fuel solution is gas-saturated and therefore will release these dissolved gases during the initial vacuum transfer operation. In some embodiments the extraction cell section 102 is designed with a vent path to direct these evolved gases directly to a gas management section and/or system 108 for a pre-determined period of time that will be defined via initial startup testing. At the completion of this "gas-purge" period, the vent line is closed and the fuel solution is directed towards the one or more extraction columns 110 in the extraction cell section 102. In another embodiment, a pre-extraction filter may also be installed to capture any corrosion products or particles that could cause blockage of the one or more extraction columns 110. As would be apparent to those of skill in the art, each of the one or more extraction cells 102 may include one or more extraction columns 110.

Next, the fuel solution passes upwards through the one or more extraction columns 110. The upward flow permits any additional gases that are released in the one or more extraction columns 110 to be captured and transported out. In these embodiments, each of the one or more extraction columns 110 is/are designed to physically accommodate a flow rate of about 80 liters per hour to about 120 liters per hour, or from about 85 liters per hour to about 115 liters per hour, or from about 90 liters per hour to about 110 liters per hour, or even about 100 liters per hour. Here, as well as elsewhere in the specification and claims, individual numerical values can be combined to form non-disclosed numerical ranges. Actual sorbent loading time may vary and as such, the loading time of the one or more extraction columns 110 may vary. In the case of the present example, column loading times are typically in the range of about two to about six hours. After passing through the sorbent contained in the one or more extraction columns 110 the fuel solution continues through the process piping and is directed back towards a fuel management portion of section/system 108 via discharge alignment valves (DAVs).

Then, at the completion of the sorbent loading phase, the DAVs are repositioned to align the effluent of the one or more extraction columns 110 with the radioactive waste management system/sub-system (RWMS) of section 108 of extraction system 100. In one embodiment, two to four, or even three column volumes of $HNO_3$ are then directed from a $HNO_3$ supply tank located in section 106 of the extraction cell layout 100 through the one or more extraction columns 110 and to a $HNO_3$ wash collection tank which is located within the waste management portion of section/system 108. The purpose of this wash cycle is to remove any residual fuel solution from the sorbent column(s).

Next, in one embodiment, about one to about three, or even about two, column volumes of water are directed from a water supply tank located in section 106 through the one or more extraction columns 110 and to a water wash collection tank which is also located within the waste management portion of section/system 108. In embodiments of the present invention, this wash cycle serves to remove any residual acid from the sorbent contained in the one or more extraction columns 110.

Next, air pressure may optionally be directed from an air reservoir tank located in section 106 through the one or more extraction columns 110 to the gas management portion of section 108. The purpose of this optional activity is to "blow-down" and dry the sorbent contained and/or located in the one or more extraction columns 110 in preparation for elution. In another embodiment, heated air is applied.

At this stage, the product (e.g., Mo-99) has been captured on the dry sorbent in the one or more extraction columns 110. The DAVs are re-positioned to align the one or more extraction columns' discharges to a purification system inlet. Next a NaOH supply valve is opened. In this example, from about six to about ten, or even about seven, column volumes of NaOH are used to elute the product from the sorbent contained/located in the one or more extraction columns 110 and direct the solution to the purification system. In this example according to the present invention, this process should take in the range of about four hours to about eight hours and can also serve to regenerate the sorbent contained/located in the one or more extraction columns 110 for subsequent extraction operations.

The final phase of the extraction process, according to the present invention, is to either dispose of the sorbent or clean and dry the sorbent contained/located in the one or more extraction columns 110 to prepare them for the next cycle. If they are reused, the one or more extraction columns 110 will undergo another water wash and air dry cycle.

Sorbent column change-outs should, and can, be conducted as necessary via the following steps. First, a pre-conditioned sorbent-containing extraction column 110 is loaded into a transfer cask and positioned under an extraction cell hatch. Next, an in-service extraction column is disconnected from all process lines via manipulator actions. Then, a replacement extraction column 110 is raised into the extraction column section 102 via a hoist or hydraulic lift. The new extraction column 110 is then connected to a column rotation device 116. Next, the column rotation device 116 is moved 180 degrees, exchanging the positions of the expended and replacement extraction columns 110. The expended extraction column 110 is then lowered into the transfer cask. After this, the new extraction column 110 is connected to the process lines via manipulators. Note that, in one embodiment according to the present invention, a single replacement extraction column 110 is preferred over a carousel design to limit radiation exposure to sorbents.

Operations according to the present invention will be automated to the extent possible to reduce human interface operations and provide process repeatability. An exemplary review of the steps is as follows.

First, an initial gas purge of the fuel solution is performed by aligning the sorbent column piping to vent to the gas management system. Upon completion of degassing operations, the operator should close the vent valve. Next, the operator is to manually align the DAVs to the fuel management system/sub-system (FMS). Then the vacuum is to be placed on the FMS collection tank and nitrogen pressure on fuel cool-down tanks. Next, the irradiated fuel transfer valve (if present) is opened to begin pressure/vacuum transfer operations. Sorbent column loading should be allowed for two to six hours. The operator should then close the fuel transfer valve (if present). Then, the operator should manually align the DAVs to the RWMS.

In one embodiment, it is preferable that the following steps be automated: The operator should open the $HNO_3$ wash collection tank valve, open $HNO_3$ reagent supply valve and transfer the appropriate quantity, in one embodiment this is between about two to about four, even about three, column volumes of the acid wash solution. The $HNO_3$ supply valve is then closed. Next, the $HNO_3$ wash collection tank valve is closed. The water wash collection tank valve is then opened. Next, the operator should open the water valve and transfer the appropriate quantity, about one to about three, even about two, column volumes of water. The water supply valve is then closed. The water wash collection tank valve is then closed. The operator should then open the air valve for the appropriate number of minutes to dry the sorbent columns. The operator should then close the air supply valve. Next, the DAVs should be aligned to the purification system. The operator should then open the NaOH valve and transfer the appropriate quantity, about six to about ten, even about seven, column volumes to elute the column(s). The NaOH supply valve should then be closed.

Again, in one embodiment, the following steps of the present invention can be automated: If the sorbent column(s) are to be reused then the operator should open the water wash collection tank valve. The water valve should then be opened and the appropriate quantity, in one embodiment this is between about one to about three, even about two, column volumes of water should be transferred. The water supply valve should then be closed. Following this, the air valve should be opened for an amount of time sufficient to dry the sorbent-containing column(s). Finally, all valves should be closed.

Embodiments of the present invention also include a purification process. This purification process further includes an iodine removal step, followed by a purification step. Note some other fission products may be removed along with the iodine at this stage.

Figure 2:
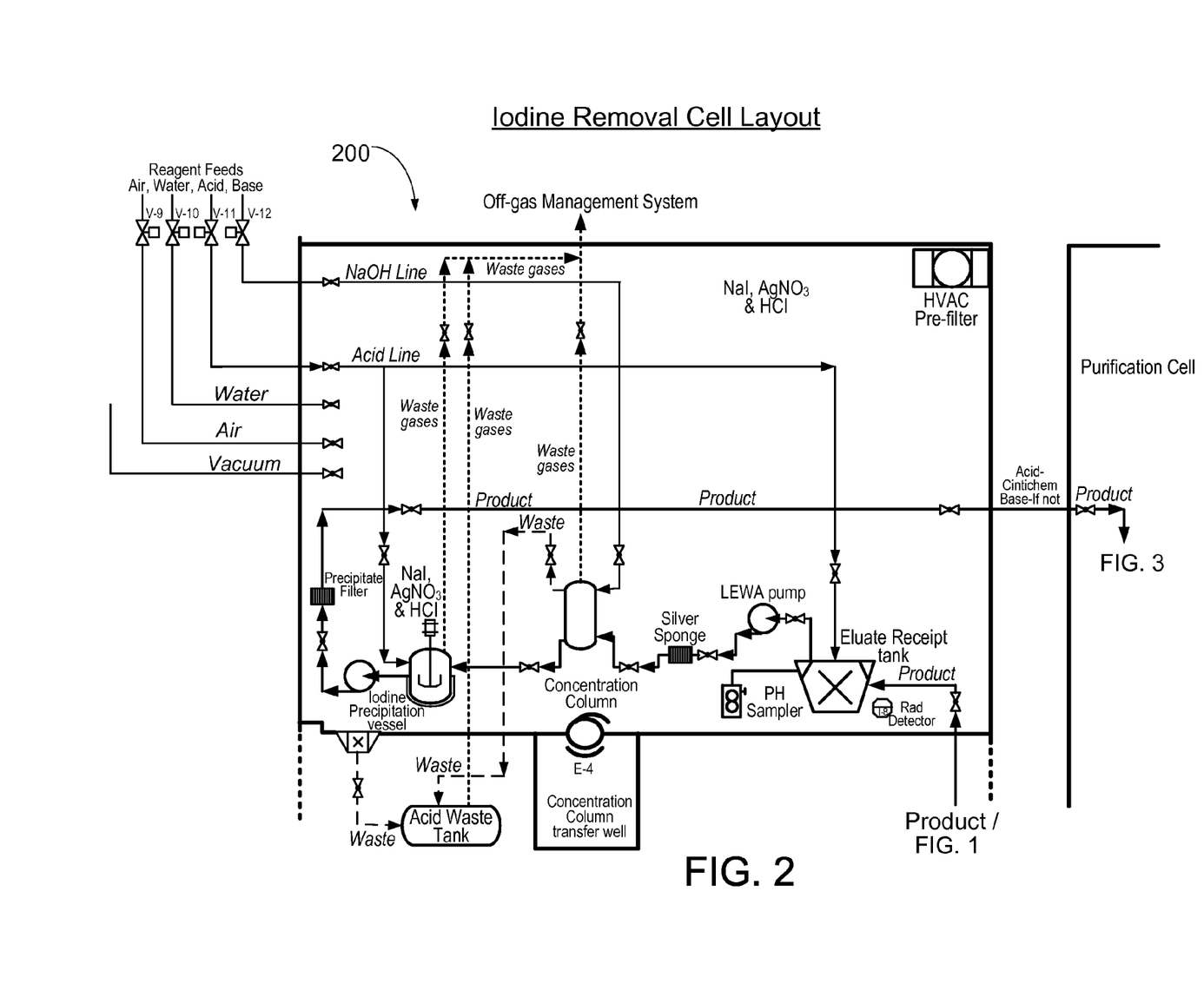
FIG. 2 is an illustration of an iodine removal cell layout according to one embodiment of the present invention.

With reference to FIG. 2, referring to the iodine removal step of the purification process, iodine exists in several oxidation states in aqueous solution in an iodine removal cell 200. An exemplary layout of an iodine removal cell 200 according to one embodiment of the present invention is illustrated in FIG. 2. The stable states are iodide ion ($I^-$), elemental iodine ($I_2$), iodate ($IO_3^-$) and periodate ($IO_4^-$ or $H_5IO_6$). The last of these exists only under very strongly oxidizing conditions. Most of the $I_2$ employed in embodiments according to the present invention is constantly circulated and captured via the reactor gas management system during reactor operations; however, some $I_2$ is soluble in aqueous media and can form a complex $I_3^-$ in the presence of $I^-$. Therefore, some $I_3^-$ and $I^-$ may carryover to the extraction sorbent and into the eluate. These latter forms of iodine can be removed via two primary mechanisms. First, the iodine species $I_2$, $IO_3^-$, and $IO_4^-$ can be removed by passing the solution through an iodine capturing material, such as silver on zeolite, silver on a carbon sponge, a silver-containing filter bed or $Ag^+$ in an aqueous solution (the $Ag^+$ can be provided from, for example, silver nitrate) where the iodine is captured on the silver and forms AgI. The iodine capturing material should be periodically replaced. The remaining $I^-$ is removable with $Ag^+$ by forming a AgI precipitate (as is done in the Cintichem process by means of silver nitrate) per the reaction: $I^- + Ag^+ \rightarrow AgI$. The process also adds an iodine carrier and hydrochloric acid to boost the mass of AgI/AgCl to be trapped out on the filter.

The iodine removal step according to embodiments of the present invention includes essentially the following substeps: First, between about six to about ten, even about seven, column volumes of the NaOH-based extraction column eluate is transferred via either a pump or via the use of a vacuum/pressure method to transfer eluate to the iodine removal cell via installed stainless steel tubing. This eluate should then undergo an acidification step to bring the pH to near 1.0. Next, this solution will be pumped from a eluate receipt tank through an iodine capturing material to remove $I_2$, $IO_3^-$, and $IO_4^-$, and then through a concentration column containing in part or total alumina or $TiO_2$ and directed towards an acid waste tank. The molybdenum product and associated impurities are now captured on this column. This column will be eluted with NaOH and will reduce the quantity of solution down to about 1/10 its initial value. This "concentrate" is collected in the iodine precipitation vessel. Those of skill in the art will note that the Cintichem process would require this solution to be acidified again and prepared via addition of NaI, $AgNO_3$ and HCl. An alternative process may include leaving the eluate in the alkaline solution and adding silver hydroxide (AgOH) and sodium chloride (NaCl). This solution is then pumped through a particulate filter to remove any remaining iodine precipitate from the solution. All off-gases are then directed towards the off-gas management system. Once the bulk iodine is removed from the solution, the molybdenum-containing solution is pumped to the purification cell for additional processing.

Figure 3:
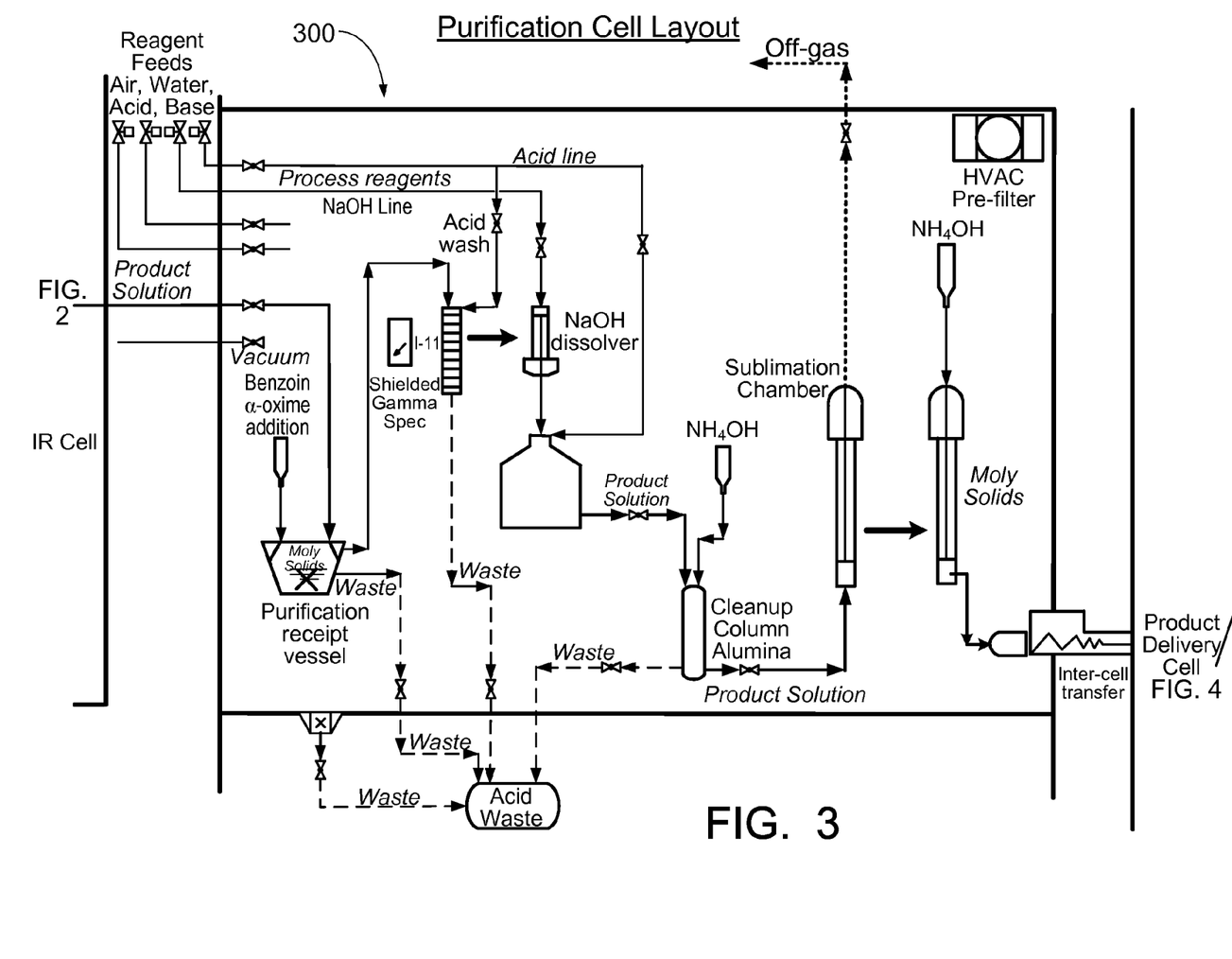
FIG. 3 is an illustration of a purification cell layout according to one embodiment of the present invention.

With reference to FIG. 3, as noted, the iodine removal step of the purification process is followed by a purification step in a purification cell 300. An exemplary layout of a purification cell 300 according to one embodiment of the present invention is illustrated in FIG. 3. While various purification processes may be applied within the scope of the presently-claimed invention, the following is one example of a process for the subsequent purification steps. It should be noted that the present invention is in no way limited to the following purification process. Other purification processes are known to those of skill in the art and can be utilized in conjunction with the present invention in place of, or in addition to, the following exemplary purification process.

The operator may perform a post-extraction filtration if a need exists to capture any hydroxides or sorbent fines formed during elution or iodine capture. Then, it must be determined whether a need exists to add an oxidizing agent ($H_2O_2$ or $KMnO_4$) to counter the following reactions: $MoO_4^{2-} + 2e^- + 4H^+ \rightarrow MoO_2 + 2H_2O$ due to the strong beta field. Then, carriers should be added for anticipated contaminants (e.g., a rhodium-containing carrier such as $RhCl_3$ and/or a ruthenium-containing carrier such as $K_2(RuCl_6)$). The molybdenum is then precipitated with benzoin-α-oxime. The molybdenum precipitate is then dissolved in nitric acid. The solution is then passed through a separations column, such as alumina. The operator may then optionally perform a sublimation step. Next, as a product preparation step, the operator should put the product in molybdate ($MoO_4^{-2}$) or $Na_2MoO_4$ chemical form. The product may then be packaged into a shipping container.

Embodiments of the present invention provide a number of advantages over what is currently known in the field. Since the "targets" discussed above are pre-existing in the LEU fuel solution, there is no need to conduct any target dissolution process. Instead, the Mo-99 is directly captured on a sorbent column which removes the product from the fuel solution, while allowing the fuel to be reused. The combination of not requiring the fabrication and subsequent dissolution of targets and providing for the capability to reuse the irradiated fuel, drastically reduces the amount of radioactive waste generated, providing a substantial advantage.

The purification process according to the embodiments of the present invention begins with the extraction column eluate, which is comprised of a NaOH solution of between about 0.5M to about 2M in strength, even about a 1M NaOH solution containing the molybdenum product and the associated impurities. The identification of the specific contaminants has been predicted by evaluation of the radiochemistry of the solution. This work predicts the contaminants most likely to be carried over in the extraction eluate according to the present invention are: iodine, ruthenium, antimony, zirconium and tellurium. The volume of eluate consists of about 10 times the extraction column volume, which is projected to be about 15 to about 20 liters (a much larger volume than the current target irradiation purification processes are designed to handle).

Various attributes to be considered in the development of the extraction and purification process according to embodiments of the present invention include allowing for maximal automation of the extraction phase; maximization of product recovery (process efficiency); minimization of the number of hours required to purify the influent solution; simplification of the process by automating the extraction phase work and minimizing the number of hot cell manipulator actions required in the purification phase.

Various aspects of the process of the present invention according to embodiments discussed above include extraction column design with single step extraction; reusing the reactor fuel solution; eluate concentration by means of a concentration column; early iodine removal to reduce radiation levels of solution; allowance for specific radionuclide removal (to account for unique sorbent capture characteristics); providing for a mechanism to capture and remove entrained gases released during the sorbent column loading and solution transfers; providing the capability to direct multiple process fluids to the extraction columns while minimizing the piping that is exposed to all the process fluids (process fluids include the irradiated fuel solution, $HNO_3$ wash solution, $H_2O$ wash, NaOH elution solution, and dry air); providing the capability to direct effluent fluids to the fuel return line, the product purification line, and the waste processing line via the DAVs; providing an extraction column design capable of processing between about 180 liters to about 260 liters, even about 240 liters, of fuel solution in a time from of about six to about fourteen hours. This includes both column loading and elution; providing the capability to routinely and remotely conduct sorbent column replacements.

The process according to the various embodiments of the present invention also improves the uranium utilization efficiency from the value of about 0.4% for current target irradiation methods to nearly 100% (a small fraction is lost via capture on the sorbent) for the process of the present invention. To accomplish this, extraction and purification systems may be designed in accordance with the present invention to process larger volumes of fuel solution and accommodate the changes in initial fuel composition due to fission product buildup yet maintain the same product purity requirements.

Since the Mo-99 product undergoes radioactive decay and has a half-life of about 66 hours, the more quickly the extraction and purification can be accomplished, the higher the overall process efficiency will be.

The process according to embodiments of the present invention accomplishes the molybdenum extraction and purification of, in an exemplary embodiment, about 240 liters within the following operation cycle parameters: The extraction column loading time is in the range of about two to about six hours. The extraction column wash and elution time is in the range of about four to about eight hours. The product purification time is preferably less than twelve hours.

Figure 4:
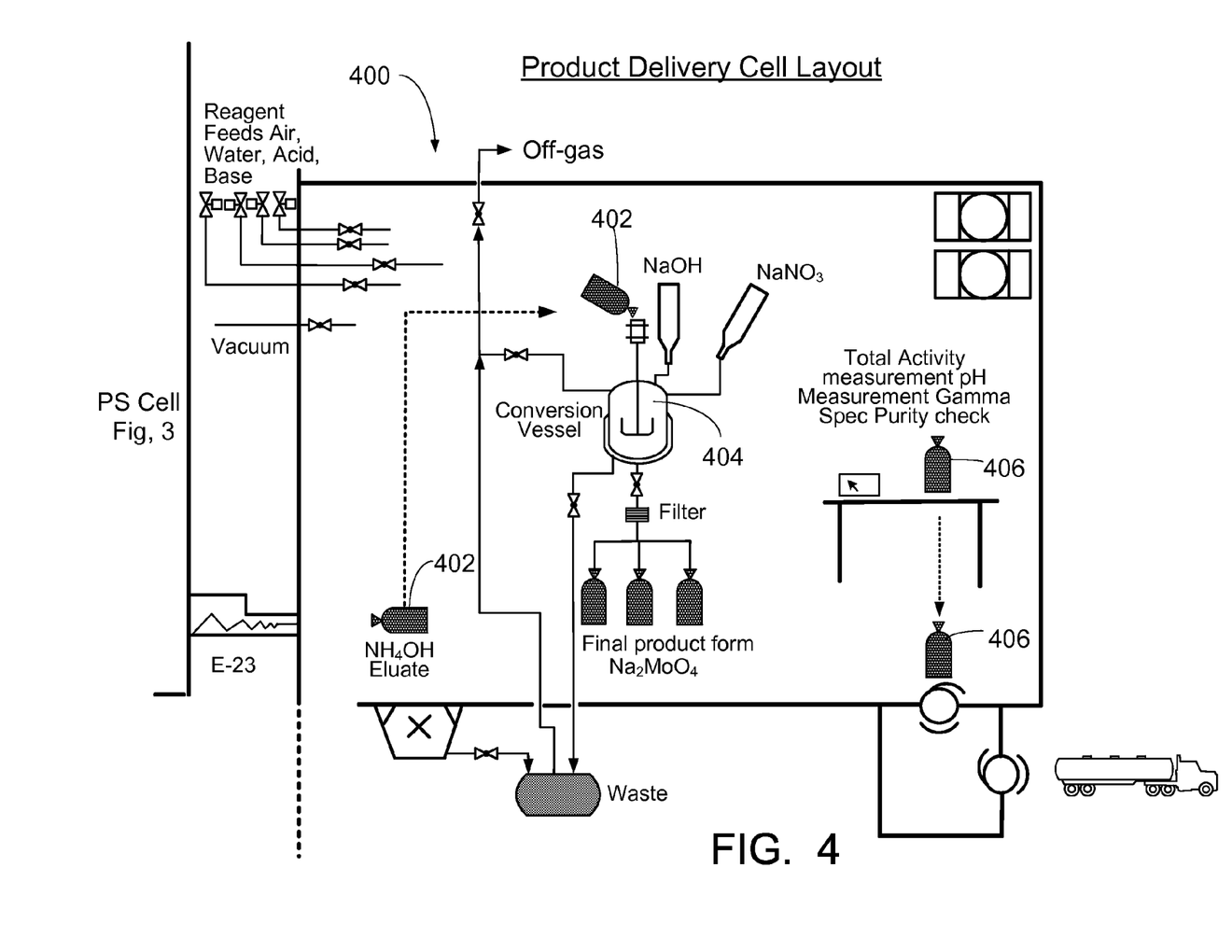
FIG. 4 is an illustration of a product delivery cell according to one embodiment of the present invention.

Turning to FIG. 4, FIG. 4 illustrates one embodiment of a product delivery cell 400. In layout 400, the eluate from purification cell 300 is collected and converted into final form. In one embodiment, the purpose of product delivery cell 400 is to take the dissolved sublimate and convert it to its final form in a sterile environment. The product so obtained is then loaded into one or more individual containers as required by customer requirements. Final purity and inventory checks are made and packaged for shipment.

The product enters cell 400 via an inter-cell transfer of the container 402 holding the dissolved sublimate solution ($NH_4OH$ in a round bottom flask). This solution is converted to the final product of $Na_2MoO_4$ in, for example, conversion vessel 404. Next, the solution is boiled off for several minutes in order to remove any remaining traces of ammonia, and allowed to cool at room temperature.

The cooled solution is filtered using, for example, a 0.2 micro meter filter, checked for clarity and dispensed into one or more suitable containers (e.g., 100 mL flasks). The solution volume is adjusted, depending on the total measured activity and a maximum radioactive concentration of 60 Ci/ml; a pH check of the bulk solution is performed (i.e., using pH paper) and divided into a number of stainless steel bottles 406, depending on the received order, for shipment. Final QA samples are captured, measured, and packaged for shipment.

Figure 5:
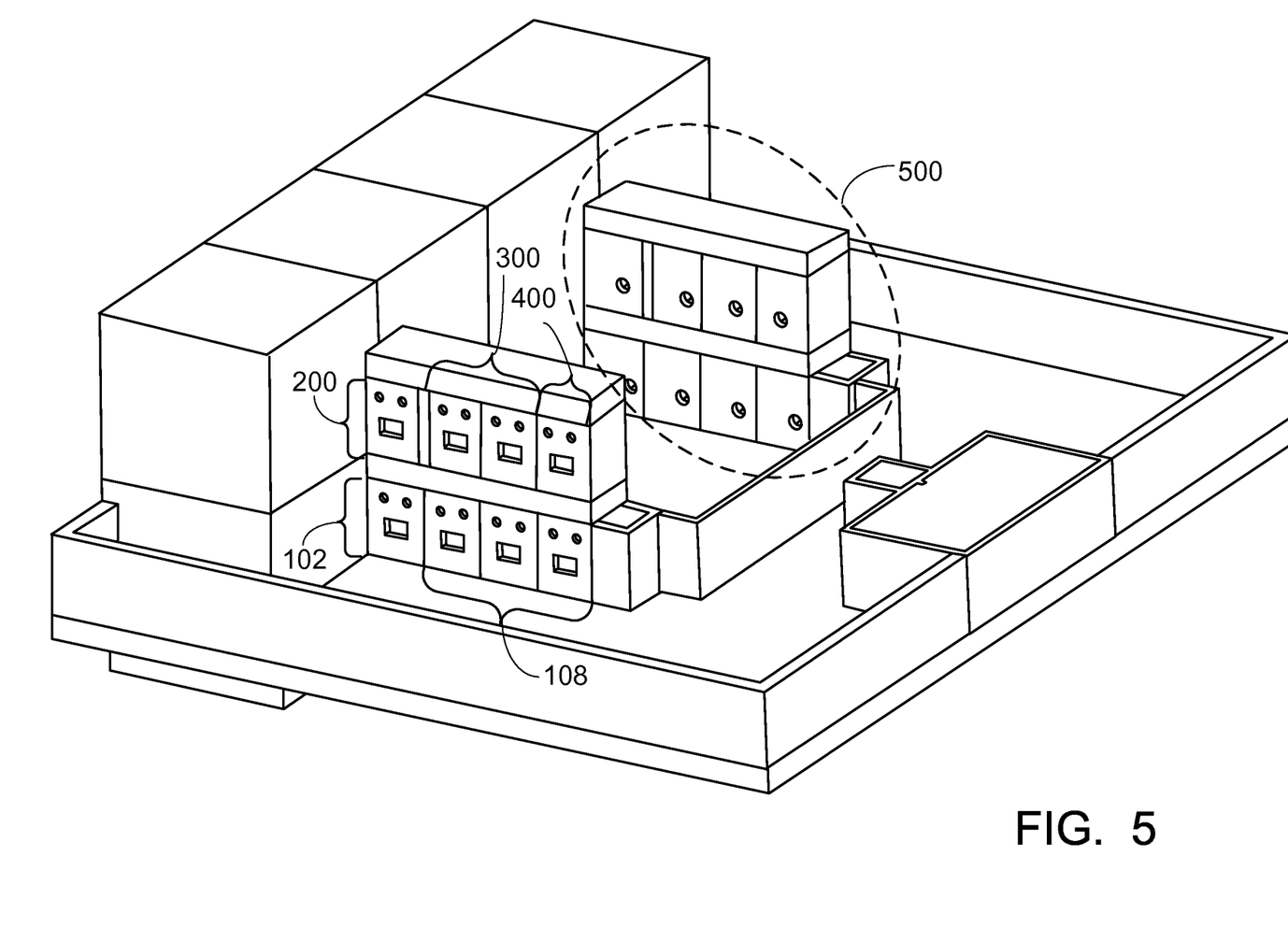
FIG. 5 is an illustration of one embodiment of an assembly in which the extraction cell of FIG. 1, the iodine removal cell of FIG. 2, the purification cell of FIG. 3 and the product delivery cell of FIG. 4 are in communication for the production of Mo-99 in accordance with the present invention.

Turning to FIG. 5, FIG. 5 illustrates one possible interconnection layout 500 between the extraction cell 102 of FIG. 1, the iodine removal cell 200 of FIG. 2, the purification cell (or cells) 300 of FIG. 3, and the product delivery cell 400 of FIG. 4 which are in communication for the production of Mo-99 in accordance with the present invention.

While a specific embodiment of the invention has been shown and described in detail to illustrate the application of the principles of the invention, it will be understood that the invention may be embodied otherwise without departing from such principles.

What is claimed is:
1. A method for the extraction of molybdenum, the method comprising the steps of:
  transferring an acidic irradiated fuel solution to an extraction system, the acidic irradiated fuel solution comprising iodine and molybdenum and other fission products, the extraction system comprising at least one sorbent-containing extraction column;

passing the acidic irradiated fuel solution through the at least one sorbent-containing extraction column to yield an acidic irradiated fuel solution remainder and at least one sorbent-containing extraction column having both molybdenum and iodine bound to the sorbent;

directing the acidic irradiated fuel solution remainder towards a fuel management system by means of at least one discharge alignment valve;

stripping the at least one sorbent-containing extraction column having both molybdenum and iodine bound to the sorbent with at least one base to yield a basic extraction solution column eluate containing molybdenum and iodine;

directing the extraction column eluate towards an iodine removal system;

removing the iodine from the extraction column eluate;

purifying the extraction column eluate; and collecting the purified eluate.

2. The method of claim 1, wherein the iodine being removed from the basic extraction column eluate is removed by a means selected from silver on zeolite, silver on a carbon sponge, a silver-containing filter bed or $Ag^+$ in an aqueous solution.

3. The method of claim 1, wherein the sorbent is a metal oxide sorbent.

4. The method of claim 3, wherein the at least one sorbent-containing extraction column contains a metal oxide sorbent that is at least about 70 weight percent metal oxide.

5. The method of claim 3, wherein the at least one sorbent-containing extraction column contains a metal oxide sorbent that is at least about 75 weight percent metal oxide.

6. The method of claim 3, wherein the at least one sorbent-containing extraction column contains a metal oxide sorbent that is at least about 80 weight percent metal oxide.

7. The method of claim 3, wherein the at least one sorbent-containing extraction column columns contains a metal oxide sorbent that is at least about 85 weight percent metal oxide.

8. The method of claim 3, wherein the at least one sorbent-containing extraction column contains a metal oxide sorbent that is at least about 90 weight percent metal oxide.

9. The method of claim 3, wherein the at least one sorbent-containing extraction column contains a metal oxide sorbent that is at least about 95 weight percent metal oxide.

10. The method of claim 3, wherein the at least one sorbent-containing extraction column contains a metal oxide sorbent that is at least about 97.5 weight percent metal oxide.

11. The method of claim 3, wherein the at least one sorbent-containing extraction column contains a metal oxide sorbent that is at least about 99 weight percent metal oxide.

12. The method of claim 3, wherein the metal oxide sorbent is selected from one or more oxides of titanium, one or more oxides of zirconium, one or more oxides of tin, one or more oxides of aluminum, or mixtures of any two or more thereof.

13. The method of claim 3, wherein the metal oxide sorbent is selected from titanium dioxide, zirconium dioxide, tin dioxide, aluminum (III) oxide, or mixtures of any two or more thereof.

14. The method of claim 3, wherein the metal oxide sorbent is selected from a sorbent having a spherical particle geometry and a particle size in the range of about 60 microns to about 120 microns.

15. The method of claim 14, wherein the sorbent has a particle size of about 70 microns to about 110 microns.

16. The method of claim 14, wherein the sorbent has a particle size of about 75 microns to about 105 microns.

17. The method of claim 14, wherein the sorbent has a particle size of about 80 microns.

18. The method of claim 1, wherein the step of passing the acidic irradiated fuel solution utilizes a low enriched uranium-based fuel.

19. The method of claim 1, wherein the step of passing the acidic irradiated fuel solution utilizes an acidic irradiated fuel from an aqueous homogenous reactor.

20. The method of claim 1, wherein at least a portion of the fission products and/or the acidic irradiated fuel solution from the method of claim 1 are reused in a nuclear reactor.

21. A method for the extraction of molybdenum, the method comprising the steps of:

transferring an acidic irradiated fuel solution to an extraction system, the acidic irradiated fuel solution comprising iodine and molybdenum and other fission products, the extraction system comprising at least one sorbent-containing extraction column;

removing iodine from the acidic irradiated fuel solution to yield a modified acidic irradiated fuel solution;

passing the modified acidic irradiated fuel solution through the at least one sorbent-containing extraction column to yield a modified acidic irradiated fuel solution remainder and at least one sorbent-containing extraction column having molybdenum bound to the sorbent;

directing the modified acidic irradiated fuel solution remainder towards a fuel management system by means of at least one discharge alignment valve;

stripping the at least one sorbent-containing extraction column having molybdenum bound to the sorbent with at least one base to yield a basic extraction solution column eluate containing molybdenum;

purifying the extraction column eluate; and collecting the purified eluate.

22. The method of claim 21, wherein the iodine being removed from the acidic irradiated fuel solution is removed by a means selected from silver on zeolite, silver on a carbon sponge, a silver-containing filter bed or $Ag^+$ in an aqueous solution.

23. The method of claim 21, wherein the sorbent is a metal oxide sorbent.

24. The method of claim 23, wherein the at least one sorbent-containing extraction column contains a metal oxide sorbent that is at least about 70 weight percent metal oxide.

25. The method of claim 23, wherein the at least one sorbent-containing extraction column contains a metal oxide sorbent that is at least about 75 weight percent metal oxide.

26. The method of claim 23, wherein the at least one sorbent-containing extraction column contains a metal oxide sorbent that is at least about 80 weight percent metal oxide.

27. The method of claim 23, wherein the at least one sorbent-containing extraction column columns contains a metal oxide sorbent that is at least about 85 weight percent metal oxide.

28. The method of claim 23, wherein the at least one sorbent-containing extraction column contains a metal oxide sorbent that is at least about 90 weight percent metal oxide.

29. The method of claim 23, wherein the at least one sorbent-containing extraction column contains a metal oxide sorbent that is at least about 95 weight percent metal oxide.

30. The method of claim 23, wherein the at least one sorbent-containing extraction column contains a metal oxide sorbent that is at least about 97.5 weight percent metal oxide.

31. The method of claim 23, wherein the at least one sorbent-containing extraction column contains a metal oxide sorbent that is at least about 99 weight percent metal oxide.

32. The method of claim 23, wherein the metal oxide sorbent is selected from one or more oxides of titanium, one or more oxides of zirconium, one or more oxides of tin, one or more oxides of aluminum, or mixtures of any two or more thereof.

33. The method of claim 23, wherein the metal oxide sorbent is selected from titanium dioxide, zirconium dioxide, tin dioxide, aluminum (III) oxide, or mixtures of any two or more thereof.

34. The method of claim 23, wherein the metal oxide sorbent is selected from a sorbent having a spherical particle geometry and a particle size in the range of about 60 microns to about 120 microns.

35. The method of claim 34, wherein the sorbent has a particle size of about 70 microns to about 110 microns.

36. The method of claim 34, wherein the sorbent has a particle size of about 75 microns to about 105 microns.

37. The method of claim 34, wherein the sorbent has a particle size of about 80 microns.

38. The method of claim 21, wherein the step of passing the acidic irradiated fuel solution utilizes a low enriched uranium-based fuel.

39. The method of claim 21, wherein the step of passing the acidic irradiated fuel solution utilizes an acidic irradiated fuel from an aqueous homogenous reactor.

40. The method of claim 21, wherein at least a portion of the fission products and/or the acidic irradiated fuel solution from the method of claim 1 are reused in a nuclear reactor.

\* \* \* \* \*